United States Patent Office 3,573,264
Patented Mar. 30, 1971

3,573,264
POLYMERIZATION OF CYCLIC ALKYLENE OXIDES WITH NITRILES AND ETHER USING BINARY CATALYST SYSTEM
Hideo Tomomatsu, Austin, Tex., assignor to Jefferson Chemical Company, Inc., Houston, Tex.
No Drawing. Filed May 5, 1969, Ser. No. 821,982
Int. Cl. C08f 3/74, 15/22
U.S. Cl. 260—85.5                               14 Claims

ABSTRACT OF THE DISCLOSURE

High molecular weight polymers having a high degree of crystallinity are obtained from the polymerization of cyclic alkylene oxides with acrylonitrile, methacrylonitrile or a mixture of either acrylonitrile or methacrylonitrile with allyl glycidyl ether employing a binary catalyst system of an organometallic compound of the formula $MZX_{y-1}$ and a polymeric aluminum alcoholate having the formula:

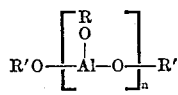

Cyclic alkylene oxides employed are those containing oxygen-carbon rings consisting of one oxygen atom in a ring with two or three carbon atoms. The polymers obtained by the process of my invention are useful in the elastomer field.

CROSS-REFERENCE TO RELATED APPLICATION

My co-pending U.S. application Ser. No. 626,391, filed Mar. 28, 1967, and now U.S. Pat. No. 3,459,685, describes the use of the catalyst systems of the present invention to polymerize cyclic alkylene oxides.

BACKGROUND OF THE INVENTION

This invention is concerned with the polymerization of cyclic alkylene oxides with other monomers using a binary catalyst system of an organometallic compound and a polymeric aluminum alcoholate. The polymerization of alkylene oxides is well-known and is discussed by J. Furukawa and T. Saegusa, Polymerization of Aldehydes and Oxides, Interscience Publishers, New York (1963).

SUMMARY OF THE INVENTION

I have now developed a method for the polymerization of cyclic alkylene oxides with acrylonitrile or methacrylonitrile or a mixture of either acrylonitrile or methacrylonitrile with allyl glycidyl ether whereby high molecular weight polymers may be obtained. In accordance with my method a binary catalyst system of a polymeric aluminum alcoholate and an organometallic compound as defined hereinbelow is employed.

DESCRIPTION OF THE PREFERRED EMBODIMENT

Polymeric aluminum alcoholates for use in my invention may be represented by the formula:

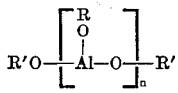

wherein R is an aliphatic, cycloaliphatic or aromatic hydrocarbon radical containing from 1 to 18 carbon atoms, R' is hydrogen or R, and n is at least 2. For example, R may be ethyl, isopropyl, butyl, cyclohexyl, nonyl, octadecyl, benzyl, phenyl and naphthyl. The degree of polymerization of such products is at least 2. Methods for the preparation of such polymers are known, and the particular way in which the polymer is prepared is immaterial insofar as my invention is concerned. Their preparation is described, for example, by Andrianov, Metallorganic Polymers, Interscience Publishers, New York (1965), p. 327. A particularly preferred polymeric aluminum alcoholate is that prepared from aluminum isopropoxide.

The organometallic compound to be used in conjunction with the polymeric aluminum alcoholate is defined as one having the formula $MZX_{y-1}$ wherein M is a metal belonging to Groups II and III, and preferably Groups II–B and III–A, of the Periodic Table, Z is a member selected from the group consisting of alkyl and aryl groups containing from 1 to 18 carbon atoms, X is selected from the class consisting of hydrogen, halogen, Z and alkoxy and aryloxy groups containing 1 to 18 carbon atoms, and y is a whole number equal to the valence of M. This metallic compound will contain at least one alkyl or aryl group and may contain additional groups of alkoxy, aryloxy, hydrogen or a halogen such as chlorine, bromine, or iodine. Examples of M include magnesium, calcium, strontium, barium, zinc, cadmium and aluminum. Typical examples of Z include methyl, ethyl, phenyl, butyl, hexyl, cyclobutyl, cyclohexyl, tolyl, ethoxy, propoxy, butoxy and phenoxy. Z is preferably an alkyl group. Especially preferred organometallic compounds are diethyl zinc and triethyl aluminum. Other acceptable compounds include diethyl aluminum hydride, ethyl aluminum dichloride, diphenyl zinc, methyl zinc phenoxide, dilauryl cadmium, triethyl gallium, phenyl cyclohexyl beryllium and dibenzyl cadmium.

The cyclic alkylene oxides that may be polymerized in my process are those containing oxygen-carbon rings in which one oxygen atom is combined with two or three carbon atoms in the ring. The ring carbon atoms may be substituted with alkyl, aryl, cycloalkyl, alkoxyl and haloalkyl groups. The most common cyclic alkylene oxides are those containing the three membered oxirane ring. Examples of such oxides include ethylene oxide, 1,2-propylene oxide, 1,2-butylene oxide, 2,3-butylene oxide, 1,2-dodecane oxide, styrene oxide and epichlorohydrin. A typical four-membered alkylene oxide is 1,3-propylene oxide, commonly referred to as oxetane. Other such cyclic oxides include 3,3-dimethyloxetane, 3,3-diethyloxetane and 3,3-di(chloromethyl)oxetane.

The concentration of the mixed catalyst may be varied from 1 to 20 wt. percent or higher based on the total weight of the monomers to be polymerized. It is preferred to use from about 5 to 10 wt. percent catalyst. The weight ratio of polymeric aluminum alcoholate to metallic compound in the catalyst may be varied from about 10:1 to 1:10 with the preferred ratio being from about 1:2 to 2:1 with a ratio of about 1:1 being particularly preferred.

The polymerization may be run at a temperature within the range of 0° to 200° C.; however, it is preferred to employ temperatures within the range of about 25° to about 150° C. To avoid loss of volatile components, the reaction is normally conducted in a closed vessel. The particular pressure at which the reaction is conducted is not critical, and ambient pressures are generally employed.

The polymerization reaction should be conducted in a dry, inert atmosphere. A dry, inert solvent is employed. The solvent may be an aliphatic or aromatic hydrocarbon or an ether. Typical solvents include cyclohexane, n-hexane, petroleum ether, pentane, heptane, benzene, toluene, diethyl ether and dipropyl ether.

After the polymerization is complete, the catalyst may be quenched by the addition of a suitable amount of a lower aliphatic alcohol, preferably isopropyl alcohol, in solution in an inert solvent as described above. Generally, sufficient alcohol is used to react with both components of the catalyst system. The presence of the quenched catalyst in the polymer does not adversely affect the polymer properties. It is also possible to add a small amount of antioxidant (usually 0.3 to 3.0 wt. percent based on the monomeric oxide) in solution in a solvent to increase the stability of the polymer.

The following examples will illustrate my invention in more detail. Examples I and II illustrate the co-polymerization of propylene oxide with acrylonitrile. The data in Table I illustrate the elasticity of the polymers prepared from a mixture of propylene oxide and acrylonitirle. The data in Table 1 illustrate a very elastic polymer as compared to a homopolymer of propylene oxide. A highly elastic polymer has many uses in the elastomer field. Example III illustrates the co-polymerization of propylene oxide with methacrylonitirle. Examples IV and V illustrate the terpolymerization of propylene oxide, allyl glycidyl ether and acrylonitrile and methacrylonitrile, respectively. Examples IV and V also illustrate vulcanization of the terpolymers obtained in each experiment.

EXAMPLE I

Polymeric aluminum isopropoxide (2.14 g.), 10.0 g. of 25% diethyl zinc heptane solution and 70 ml. of benzene were mixed under dry nitrogen atmosphere in a reaction vessel. Benzene (130 ml.) and a mixture of 25 g. of propylene oxide and 25 g. of acrylonitrile were added to the catalyst mixture. The reaction vessel was closed and subjected to shaking for 24 hours in an oil bath with a constant temperature of 80° C. The reaction mixture was evaporated to give 26.7 g. of brown colored, non-sticky tough solid. This product can be extruded to a strong elastic cord.

EXAMPLE II

Polymeric aluminum isopropoxide (4.28 g.) was dissolved in 300 ml. of dry cyclohexane in a reaction vessel. Twenty grams of 25% diethyl zinc heptane solution was added to the reaction vessel under dry nitrogen atmosphere. A mixture of 60 g. of propylene oxide and 40 g. of acrylonitrile was added to the catalyst mixture and the solution was subjected to shaking at 80° C. for 24 hours. The polymer obtained from the reaction was dried in open air to give 64.2 g. of pale brown-colored, non-sticky, tough solid. This product was extruded at 160° C. to give a light brown colored elastic cord. The cord so obtained was cold drawable and the cold drawn cord showed an ultimate elongation of 160%, 505 pounds per square inch (p.s.i.) of 100% modulus and a tensile strength of 1822 p.s.i.

EXAMPLE IV

Polymeric aluminum isopropoxide (2.14 g.) was placed in a pressure bottle and stirred with 200 ml. of dry cyclohexane under dry nitrogen atmosphere. Ten grams of 25% diethyl zinc solution in heptane was added to this mixture and stirring was continued for 10 minutes in the same inert atmosphere. Twenty-five grams of propylene oxide, 20 g. of acrylonitrile and 5 g. of allyl glycidyl ether were mixed together and this mixture was added to the catalyst solution. The reaction vessel was closed with a stainless steel cap-equipped Teflon O-ring and subjected to shaking at 80° C. for 24 hours. After evaporating the solvent in open air, the reaction mixture gave 22 g. of brownish-yellow, non-sticky elastic material. The terpolymer (100 g.) obtained was milled by a two roll mill at room temperature and mixed with 5 g. of zinc oxide, 1 g. of stearic acid, 2 g. of sulfur flour, 2 g. of tetramethyl thiuram disulfide and 1 g. of 2-mercaptobenzothiazole. This mixture was cured at 150° C. for 45 minutes under 15 ton/in.$^2$ pressure. The vulcanized product was a strong, non-sticky rubber.

EXAMPLE V

A terpolymer was prepared according to Example IV except that 20 g. of methacrylonitrile was used in place of the acrylonitrile. Vulcanization of the product obtained gave a strong, non-sticky rubber.

What is claimed is:

1. A method for polymerization wherein the polymer contains a cyclic alkylene oxide having an oxygen-carbon ring in which the oxygen atom is joined with 2 to 3 carbon atoms in the ring, which comprises mixing the oxide with acrylonitrile or methacrylonitrile, or a mixture of allyl glycidyl ether and acrylonitrile or methacrylonitrile at 0° to 200° C in a closed vessel and in a dry, inert atmosphere with from 1 to 20 wt. percent based on the total weight of the monomers of a binary catalyst system of (A) a polymeric aluminum alcoholate represented by the formula:

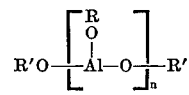

wherein R is an aliphatic, cycloaliphatic or aromatic hydrocarbon radical containing 1 to 18 carbon atoms, R' is hydrogen or R, and $n$ is at least 2 and

TABLE 1

| Experiment No. | Material [1] | 100% modulus (p.s.i.) | Ultimate elongation (percent) | Tensile strength (p.s.i.) |
|---|---|---|---|---|
| 1 | Poly(propylene oxide) | 1,489 | 77 | 2,084 |
| 2 | Polymer prepared from mixture of propylene oxide and acrylonitrile. Acrylonitrile content in initial mixture: | | | |
| | 10% | 826 | 150 | 1,515 |
| 3 | 20% | 532 | 170 | 1,364 |
| 4 | 30% | 679 | 200 | 1,783 |
| 5 | 40% | 505 | 160 | 1,822 |

[1] All elastomers were cold drawn before the tests.

EXAMPLE III

Methacrylonitrile (33.5 g., 0.5 mol) was mixed with 29 g. (0.5 mol) of propylene oxide. This mixture was added under dry nitrogen atmosphere to a reaction vessel containing a catalyst solution of 200 ml. of dry cyclohexane, 2.14 g. of polymeric aluminum isopropoxide and 10 g. of 25% diethyl zinc solution in heptane. The reaction vessel was closed with a stainless steel cap equipped with a Teflon O-ring and subjected to shaking at 80° C. for 24 hours. After cooling, the reaction mixture was taken out and dried to give 42 g. of deep reddish colored tough elastic polymer. The polymer was extruded at 232° C. to give a cold drawable elastic cord which showed good heat resistance.

(B) an organometallic compound having the formula:

wherein M is a metal from Groups II and III of the Periodic Table, Z is an aryl or alkyl group containing from 1 to 18 carbon atoms, X is hydrogen, halogen, Z, an alkoxy or aryloxy group containing 1 to 18 carbon atoms, and $y$ is an integer equal to the valence of M, the weight ratio of compound (A) to compound (B) in the catalyst mixture being within the range of from 10:1 to 1:10.

2. A method as in claim 1 wherein M is a metal from Groups II-B and III-A of the Periodic Table.

3. A method as in claim 2 wheren the temperature is wthn the range of 25° to 150° C. and the catalyst concentration is within the range of 5 to 10 wt. percent based on the total weight of monomers and the weight ratio of compound (A) to compound (B) is within the range of 2:1 to 1:2.

4. A method as in claim 2 wherein Z is an alkyl group containing 1 to 18 carbon atoms.

5. A method as in claim 4 wherein compound (A) is polymeric aluminum isopropoxide and compound (B) is diethyl zinc.

6. A method as in claim 5 wherein the temperature is within the range of 25° to 150° C., the concentration of the catalyst mixture is between 5 to 10 wt. percent based on the total weight of monomers and the weight ratio of polymeric aluminum isopropoxide to diethyl zinc is between 2:1 and 1:2.

7. A method for co-polymerization as in claim 5 wherein propylene oxide is polymerized with acrylonitrile.

8. A method for co-polymerization as in claim 5 wherein propylene oxide is polymerized with methacrylonitrile.

9. A method for polymerization as in claim 5 wherein propylene oxide is polymerized with allyl glycidyl ether and acrylonitrile or methacrylonitrile.

10. A method as in claim 4 wherein compound (A) is polymeric aluminum isopropoxide and compound (B) is triethyl aluminum.

11. A method as in claim 10 wherein the temperature is within the range of 25° to 150° C., the catalyst concentration is between 5 to 10 wt. percent based on the total weight of monomers and the weight ratio of polymeric aluminum isopropoxide to triethyl aluminum is between 2:1 and 1:2.

12. A method for co-polymerization as in claim 11 wherein propylene oxide is polymerized with acrylonitrile.

13. A method for co-polymerization as in claim 11 wherein propylene oxide is polymerized with methacrylonitrile.

14. A method for polymerization as in claim 11 wherein propylene oxide is polymerized with allyl glycidyl ether and acrylonitrile or methacrylonitrile.

References Cited
UNITED STATES PATENTS 3,384,603    5/1968    Elfers _____ 260—2

HARRY WONG, JR., Primary Examiner

U.S. Cl. X.R.

260—2, 79.5, 88.7